United States Patent
Peak

[15] 3,667,291
[45] June 6, 1972

[54] TRACTOR PULL LOAD MEASURING DEVICE

[72] Inventor: Leonard R. Peak, Lacona, Iowa 50139

[22] Filed: Nov. 16, 1970

[21] Appl. No.: 89,628

[52] U.S. Cl. ...................................................73/141 R
[51] Int. Cl. .......................................................G01l 5/13
[58] Field of Search..........................................73/133, 141 R

[56] References Cited

UNITED STATES PATENTS

| | | | |
|---|---|---|---|
| 1,592,182 | 7/1926 | Davidson et al. | 73/133 |
| 1,603,521 | 10/1926 | Davidson et al. | 73/141 R |
| 3,491,590 | 1/1970 | Watkins | 73/141 R |

*Primary Examiner*—Charles A. Ruehl
*Attorney*—Zarley, McKee & Thomte

[57] ABSTRACT

A device having an elongated frame supported at its rear end by ground engaging wheels and having a slid below the frame pivotally connected thereto forwardly of the wheels. The skid is adapted to engage the ground along its length during use or be raised above the ground for transport by a tongue being connected to the skid and the frame being pivoted upwardly about an axis through the wheels thereby lifting the rear of the skid. A ballast trolley is moveable from over the wheels on the frame to the front end as the wheels turn thereby increasing the drag due to the load being transferred to the skid engaging the ground. Measuring indicia along the frame is provided to indicate the pulling ability of the vehicle being tested in terms of how far the ballast trolley is moved forwardly.

9 Claims, 9 Drawing Figures

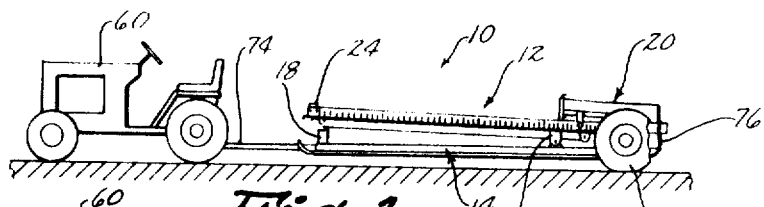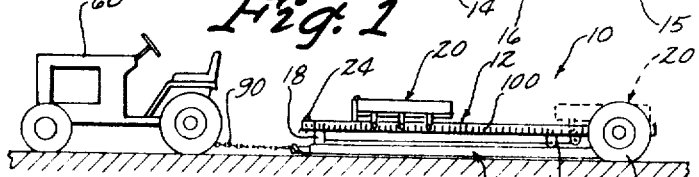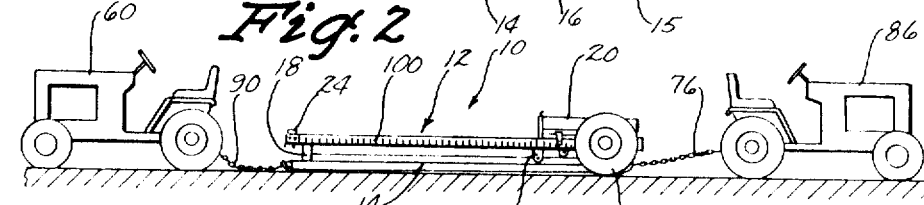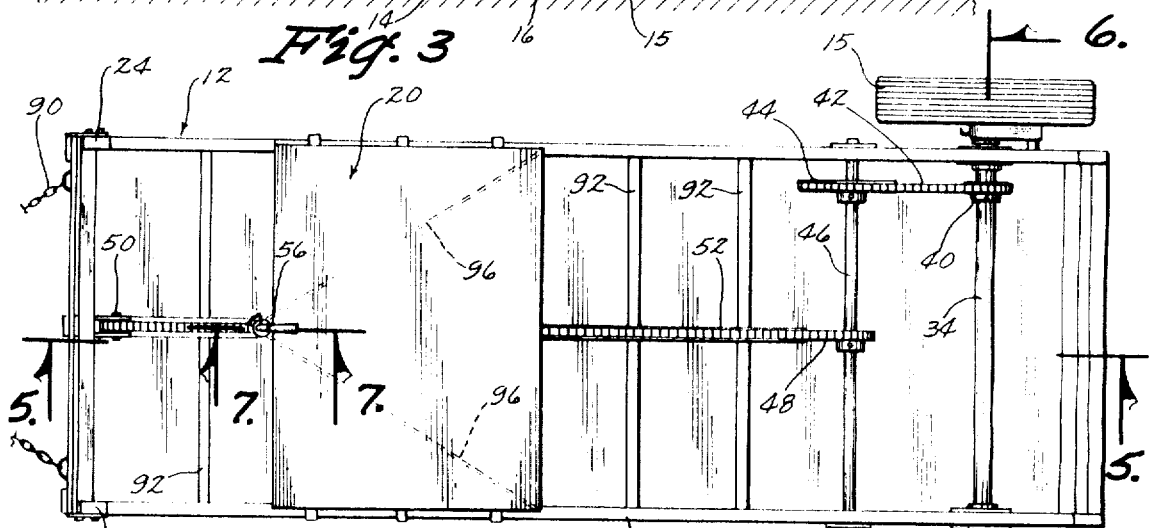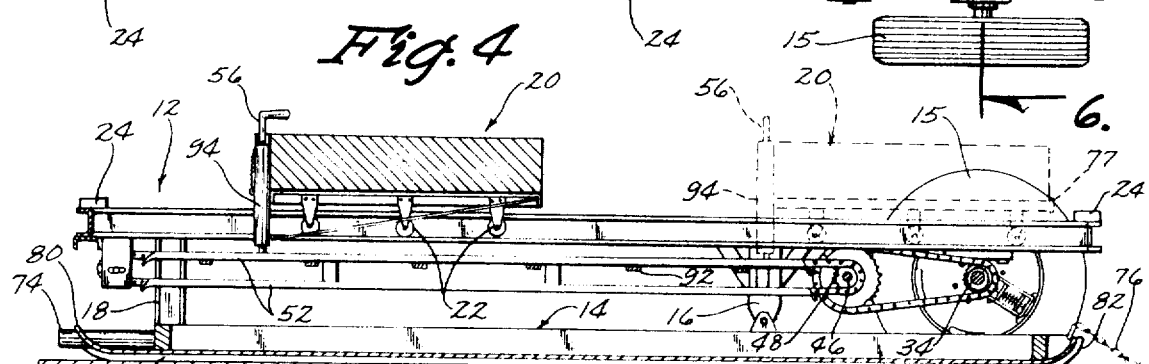

INVENTOR
LEONARD R. PEEK
BY
ATTORNEYS

TRACTOR PULL LOAD MEASURING DEVICE

A popular recreational activity among people having farm or garden tractors is to test competitively the power of the tractor. This is done commonly at tractor pull events. A simple device has been needed for measuring the pulling ability of tractors for use at these events and it is necessary that the device be easily transported between different geographical locations for different events. It is also necessary that the device be easily reset so that as many "pulls" as possible can be carried out in the shortest possible time.

The tractor pull load measuring device of this invention will provide an accurate measure of the tractor's pulling ability and accommodate tractors of a wide range of power characteristics.

The measuring device includes a frame on rear ground engaging wheels with a skid pivotally connected to the frame for engagement with the ground. A ballast trolley is movable on the frame in response to the turning of the ground engaging wheels. A releaseable pin on the trolley engages a link of a continuous chain drive extending between the front and rear ends of the frame. The farther forward the ballast trolley is moved the harder the pulling is and if the trolley is moved completely to the forward end of the frame the pin will be disengaged from the sprocket chain by a sprocket tooth. The pin may be locked in a disengaged position and the trolley may be manually rolled on the frame to the rear end for the next pull.

Due to the flexure of the frame the load is somewhat increased disproportionately after the trolley moves past the pivot point between the skid and the frame. Variation in the drag characteristics of the device may be obtained by varying the air pressure in the tires whereby the less the air pressure the greater is the drag and the greater the air pressure the less the drag since the rear of the skid is lowered and raised accordingly.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is an illustrative view of a tractor pulling the tractor pull load measuring device of this invention in a transport position;

FIG. 2 is a view similar to FIG. 1 but showing the device being used to test the pulling ability of the tractor;

FIG. 3 is an illustrative view showing a second tractor pulling the device back to the starting point for the next test to be conducted;

FIG. 4 is a top plan view of the device;

FIG. 5 is a cross sectional view taken along line 5—5 in FIG. 4;

Figure 6:
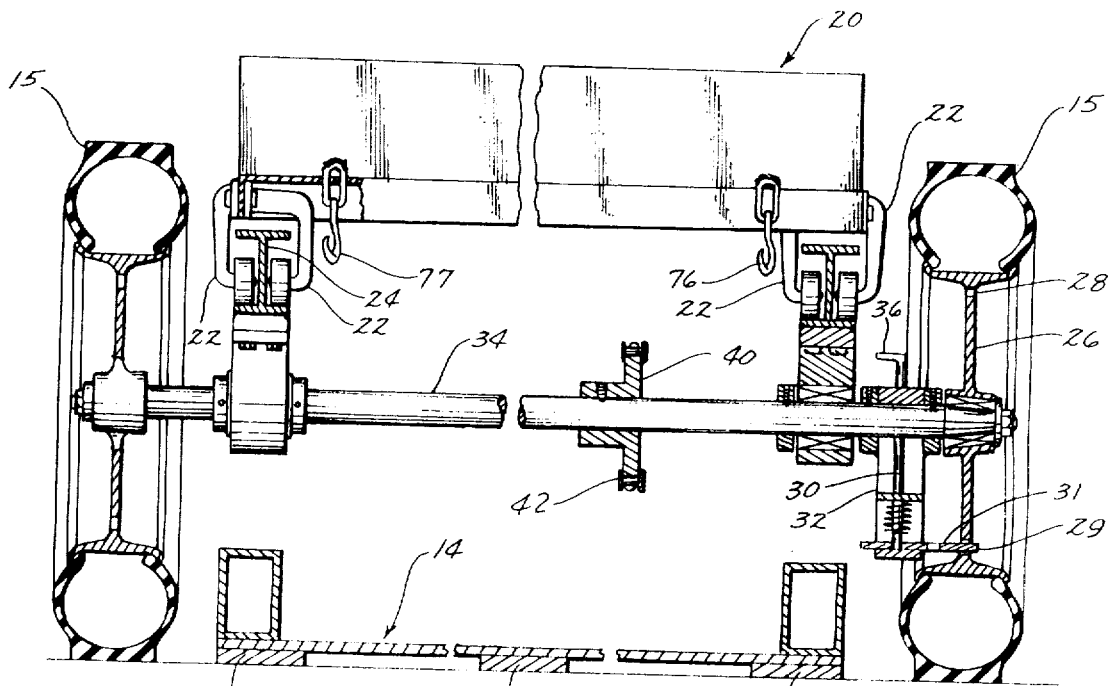
FIG. 6 is a cross sectional view taken along line 6—6 in FIG. 4.
Figures 7, 8:
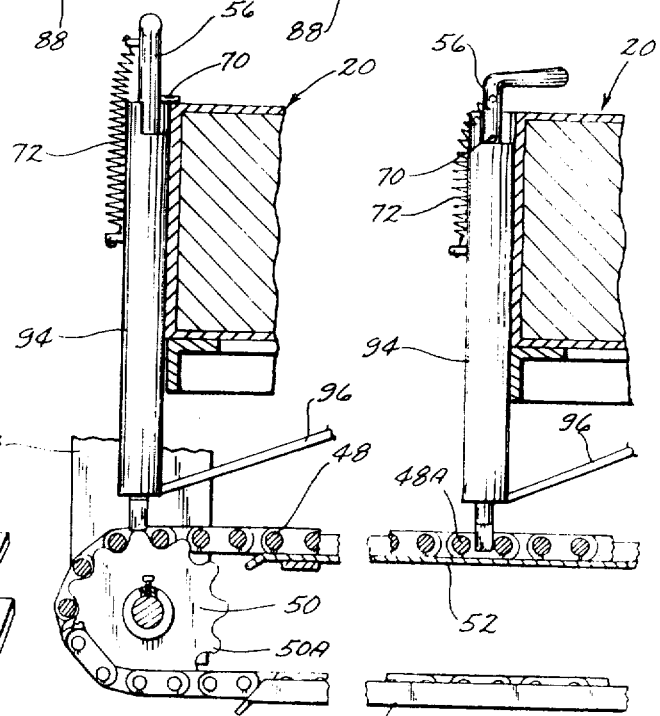
FIG. 7 is a cross sectional view taken along line 7—7 in FIG. 4.
Figure 9:
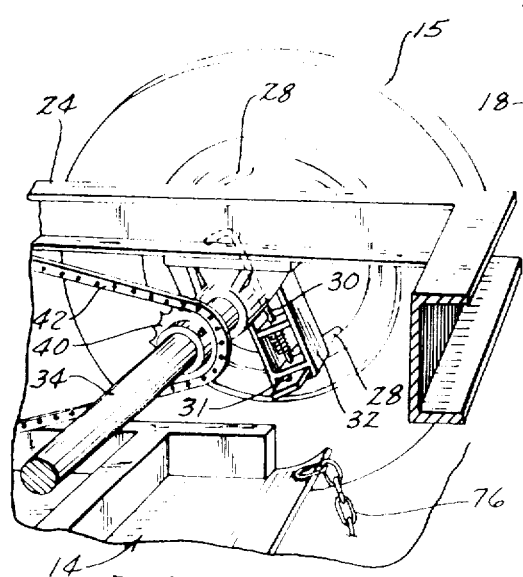

FIG. 8 is a view similar to FIG. 7 but showing the ballast trolley pin disengaged from the sprocket chain by the sprocket wheel and the pin locked in an up disengaged position for returning the ballast trolley to the rear of the device; and FIG. 9 is a fragmentary perspective view of the drive assembly interconnecting the ground engaging wheels to the sprocket chain for moving the ballast trolley as the device is moved forwardly.

The tractor pull load measuring device of this invention is referred to generally in FIG. 1 by the reference numeral 10 and includes an upper rectangular elongated frame 12 having oppositely disposed rubber tired wheels 15 at the rear thereof. A rectangular skid 14 is pivotally connected to the frame 12 through downwardly extending ears 16 positioned forwardly of the wheels 15. An upstanding post 18 is provided at each corner of the skid 14 for engagement by the frame 12.

A ballast trolley 20 is movably connected by a series of inwardly and outwardly facing rollers 22 engaging opposite sides of the I-beam rails forming side members 24 in the frame 12. The forward and rear ends of the frame 12 include stop elements 24 to limit travel of the ballast trolley 20.

The wheels 15 include rims 26 having peripheral slotted openings 28 adapted to receive a retractable plate element 29 locked in place by a pin 30 normally biased into one of the two openings 31 in the plate element 29 such that the plate element is either in engagement with the rim or disengaged therefrom. The pin 30 is carried on an assembly 32 fixedly mounted on a shaft 34 extending between the two ground engaging wheels 15. A handle 36 is provided to operate the pin 30. Upon rotation of the wheels 15 the shaft 34 is caused to rotate and in turn rotates a sprocket 40 which drives a sprocket chain 42 connected to a sprocket wheel 44 on a transversely extending shaft 46. The shaft 46 includes a sprocket chain 48 extending to the front of the frame 12 around a sprocket wheel 50. A U-shaped channel 52 provides support for this sprocket chain 48 to maintain it in a constant horizontal plane directly below the ballast trolley 20. A retractable pin 56 is provided on the forward side of the trolley 20 and is adapted to engage a link 48A as seen in FIG. 7 to move the ballast trolley forward as the device 10 is pulled forwardly by a tractor 60 as seen in FIG. 2. Upon the ballast trolley 20 reaching the forward end of the frame 12 the pin 56 is pushed upwardly by a tooth 50A on the sprocket 50 and thus the trolley can move no farther even though the device 10 is pulled farther. The trolley then may be returned to its rear starting position as seen in FIG. 2 by the dash lines by locking the pin 56 in its raised position and this can be accomplished by turning the pin 90 degrees such that an element 70 rests on top of the ballast trolley 20 as seen in FIG. 8. A spring 72 tends to maintain the pin 56 in a down position thereby maintaining it in engagement with the sprocket chain link 48A.

When it is desired to transport the device 10 from one site to another site, the skid 14 must be raised out of engagement with the ground and this is accomplished by connecting a rigid tongue 74 rigidly to the skid 14, as seen in FIG. 1, which causes the front end of the device 10 to be raised above the ground. The rear end of the device is raised above the ground by pivoting the frame 12 upwardly about the axis of the wheel shaft 34 and this is accomplished by use of a jack or the like, and the rear ends of the skid 14 and the frame 12 are held close together as seen in FIG. 1 by a chain 76. It is seen that as the frame 12 is pivoted upwardly the skid 14 is also raised through its connection to the frame by the downwardly extending ears 16. It is understood that the frame and skid may be lowered and raised as fine adjustments are required by deflating or inflating the tires on the wheels 15.

The skid 14 has upwardly flared forward and rearward ends 80 and 82 and a pair of chains 76 connected thereto may either be connected to the hooks 77 on the ballast trolley 20 to hold the frame 12 in a raised position, as seen in FIG. 1, or the chain 76 may be connected to a second tractor 76, as seen in FIG. 3, for pulling the device 10 back to a starting position.

The bottom side of the skid 14 preferably includes three runners 88 for engagement with the ground.

During a pull, a chain 90 is connected to the drawbar of the tractor 60, as seen in FIG. 2, and the drag of the device 10 may be varied by varying the length of the chain 90 as the longer the chain the greater the drag will be.

Reinforcement for the frame 24 is provided by a series of transversely extending bars 92, as seen in FIG. 4, and the pin 56 mounted in a sleeve 94 on the front of the ballast trolley 20 is reinforced by diagonally rearwardly extending rods 96.

Obviously, the conditions of use of the device 10 may vary substantially and the operational characteristics of the device itself may vary as desired. Preferably, for a garden-type tractor having a horse power of seven to fourteen horse power, the ballast in the ballast trolley 20 would weigh approximately 1,200 pounds. The balance of the machine would weigh approximately 1,100 pounds. The gear ratios for the sprocket chain 48 being driven by the wheel shaft 34 are such that the trolley 20 will move from the rear end to the front end in approximately 120 to 130 feet of travel of the device 10. The sprocket chain moves three inches for every revolution of the ground engaging wheel 14.

The increase in the drag load theoretically should increase proportionately to the distance the ballast trolley 20 is from the rear wheel axle 34 but the flecture of the frame 12 is such that when the trolley 20 moves past the pivotal point between the frame and the skid the drag will increase more rapidly and thus this pivot point may be varied somewhat as desired but should be approximately three feet from the rear axle 34. When the ballast trolley is all the way to the rear, as seen by the dash line representation in FIG. 5, the weight is uniformly distributed between the pivot point through the ears 16 and the wheel axle 34.

It is apparent that to move the ballast trolley 20 forwardly the wheels 15 must maintain some engagement with the ground and thus must carry some of the load in order to drive the sprocket chain 48 which in turn propels the ballast trolley 20. Again, proper inflation of the tires can be helpful in appropriately distributing the load between the skid 14 and the wheels 15. Preferably, ninety percent of the weight will be carried on the skid 14 leaving ten percent for traction for the wheels 15.

In operation it is thus seen that the device 10 is placed at the starting line, the rigid tongue 74 has been removed and the chain 90 is connected to the drawbar of the tractor 60. The frame 12 at its forward end is resting on the upstanding post 18 on the skid 14 and the ballast trolley 20 is in its rearward most position as seen by the dash line representation in FIG. 2. The conditions are such that practically all tractors competing in the tractor pull can move the device 10 and the ballast trolley 20 on the frame 12 at least a few feet and probably to at least a point where the ballast trolley 20 is past a vertical plane extending through the pivotal connection between the frame 12 and the skid 14 since at this time the drag increases more rapidly. In any event, the tractor 60 will either become overloaded and kill the engine or the tires will begin to spin and at this time a reading may be made on the measurement scale 100 along the side of the frame 12 for purposes of scoring this particular contestant. Preparation for the next pull is made by disengaging the pin 56 from the sprocket chain 48 through raising the pin into the locked raised position of FIG. 8, and then manually pushing the ballast trolley 20 to the rear dash line position of FIG. 2. A tractor 86 may pull the device 10 back to the starting line by connecting the chain 76 to the drawbar of the tractor 86. As indicated previously, should it be possible for a given contestant to pull the device 10 far enough that the ballast trolley 20 would move its maximum distance, the trolley would be automatically disengaged from the sprocket chain by the pin 56 being ejected therefrom by a tooth 50A on the sprocket 50, as seen in FIG. 8.

After a meet is completed and it is desired to move the device 10 to another geographical site, the rigid tongue 74 is telescopically connected to a longitudinally extending pipe on the skid 14 whereby the front end of the device 10 may be raised and held in position on the drawbar of the tractor 60, as seen in FIG. 1. The rear end of the skid 14 is raised by pivoting the front end of the frame 12 upwardly and this is accomplished as indicated previously for example, by the use of a jack and the chains 76 are connected to the hooks 77 on the ballast trolley 20 to hold the frame in its upwardly pivoted position. The tires are reinflated if necessary for road travel.

I claim:

1. A tractor pull load measuring device comprising,
   an elongated frame having front and rear ends and having ground engaging wheels at the rear end thereof,
   an elongated skid extending longitudinally under said frame and being pivotally connected to said frame forwardly of said wheels, and having a ground engaging front end,
   stop means for limiting relative vertical pivotal movement of said frame and skid towards each other at the front end thereof,
   coupling means for connecting said skid to the drawbar of a tractor,
   a ballast trolley moveable longitudinally on said frame, and
   drive means for operatively connecting said wheels to said ballast trolley whereby as said wheels are rotated forwardly said ballast trolley is moved forwardly thereby shifting weight on said trolley from said wheels to the front ground engaging end of said skid.

2. The structure of claim 1 wherein said drive means includes a continuous link sprocket chain extending between the front and rear ends of said frame and a pin means on said trolley releaseably engages said chain.

3. The structure of claim 2 wherein a pin ejection means is associated with said chain and is adapted to disengage said pin from said chain upon said chain moving a predetermined distance towards said front end.

4. The structure of claim 3 wherein said pin ejection means is further defined as a sprocket at the front end of said frame in engagement with said chain and the teeth on said sprocket being adapted to eject upwardly said pin from engagement from said chain to limit movement of said trolley.

5. The structure of claim 4 wherein a guide channel supports the top half of said chain between the front and rear ends of said frame.

6. The structure of claim 1 wherein one of said wheels is rotatably mounted on a shaft and a member secured on said shaft is adapted to be detachably connected to said one wheel and said shaft is operatively connected to said chain.

7. The structure of claim 1 wherein said frame and said skid are adapted to be pivoted towards each other at said rear end upon external forces being applied, and lock means being provided for holding said frame and skid in said pivoted position for transporting.

8. The structure of claim 1 wherein said coupling means includes a detachable tongue for rigid engagement with the front end of said skid for transporting said device upon said tongue being connected to a pulling vehicle.

9. The structure of claim 1 wherein said coupling means includes a tongue means provided for connecting said skid to a vehicle and lifting said skid off of the ground at the front end thereof, and means for holding said frame in an upwardly pivoted position above said skid at the front end thereby raising the rear end of said skid off the ground for transporting said device on said wheels.

* * * * *